United States Patent [19]

Drewett

[11] Patent Number: 4,548,150
[45] Date of Patent: Oct. 22, 1985

[54] READILY REPLACEABLE BUMPER GUARD SUPPORT AND BUMPER FOR WATER COVERED AREAS

[76] Inventor: Glen E. Drewett, P.O. Box 15, Negreet, La. 71460

[21] Appl. No.: 407,034

[22] Filed: Aug. 11, 1982

[51] Int. Cl.⁴ .............................................. B63B 69/02
[52] U.S. Cl. ................................... 114/219; 405/212; 267/140
[58] Field of Search ............... 114/218, 219; 267/139, 267/140; 293/102, 120, 121, 122, 123, 126, 127, 128, 142; 405/212, 215; 248/219.1

[56] References Cited

U.S. PATENT DOCUMENTS

| | | | |
|---|---|---|---|
| 2,892,315 | 6/1959 | Blancato | 405/212 |
| 3,197,189 | 7/1965 | Pemper et al. | 114/219 |
| 3,608,882 | 8/1971 | Culp | 114/219 |
| 3,937,170 | 2/1976 | Drewett | 114/219 |
| 4,198,919 | 4/1980 | Evans et al. | 114/219 |

FOREIGN PATENT DOCUMENTS 0057155  8/1982  European Pat. Off. ............ 293/142

Primary Examiner—Trygve M. Blix
Assistant Examiner—Edwin L. Swinehart
Attorney, Agent, or Firm—Jack W. Hayden

[57] ABSTRACT

A quadrilateral is secured to horizontally extending and vertically spaced supports adjacent a water covered area. A support frame is secured to the quadrilateral in a downward, parallel relationship thereon and projects forwardly of the quadrilateral. A longitudinally extending elongated elastomer body bumper is removably secured on the support frame, and a stabbing guide is provided adjacent the lower end of the quadrilateral which includes a forward portion spaced laterally relative to the quadrilateral and which extends upwardly and outwardly therefrom to serve as a guide to receive and support the lower end of the support frame as it and the elongated elastomer body bumper thereon are lowered longitudinally of the quadrilateral in a water covered area to be positioned on and supported by the quadrilateral in the water covered area.

1 Claim, 4 Drawing Figures

U.S. Patent     Oct. 22, 1985     4,548,150
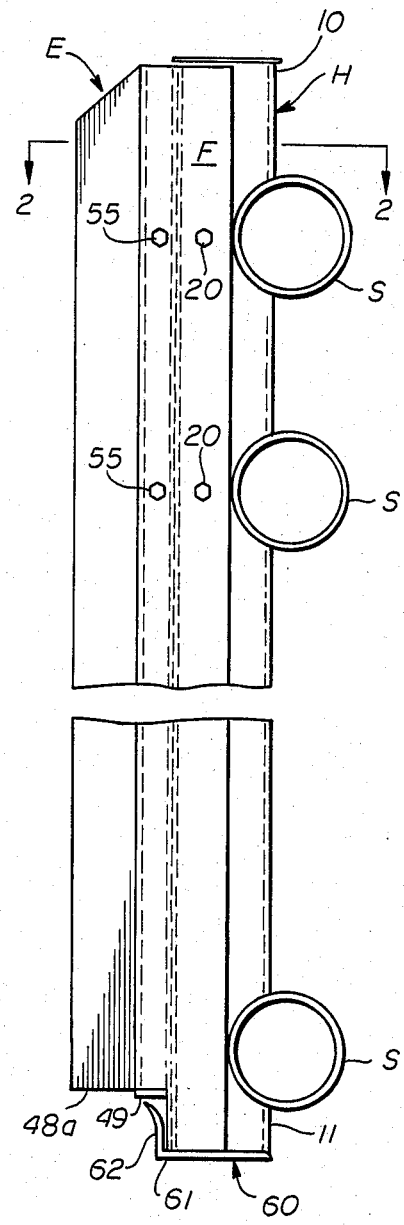
fig.1
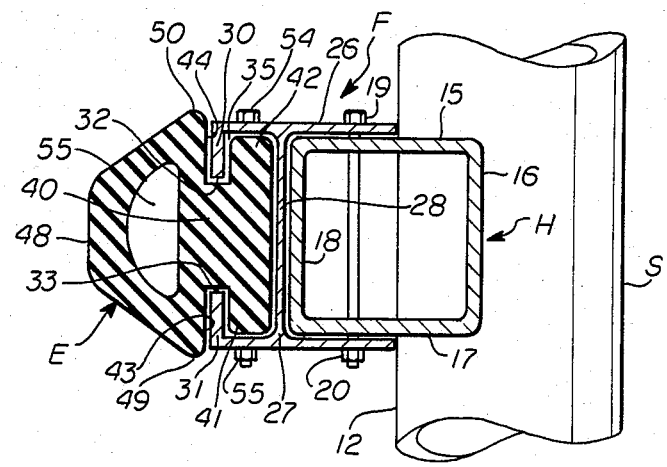
fig.2
fig.3
fig.4

READILY REPLACEABLE BUMPER GUARD SUPPORT AND BUMPER FOR WATER COVERED AREAS

SUMMARY OF THE INVENTION

The present invention is an improvement on my U.S. Pat. No. 3,937,170 issued on Feb. 10, 1976. While such structure functions quite well, the support for the elastomer body of such prior patent in some instances may erode to such an extent that it also requires repair or replacement. In order to obviate the necessity of underwater welding and the use of divers to repair such support, the present invention contemplates an arrangement which enables the elastomer bumper as well as the support therefor to be readily removed from its position in a water covered area for repair or replacement as the need may arise.

This and other objects and advantages of the present invention will become more readily apparent from a consideration of the following drawings and descriptions.

BRIEF DESCRIPTION OF THE DRAWINGS

FIG. 1 is a side elevational view, partly in section, illustrating one of the devices of the present invention in position for use;

FIG. 2 is a sectional view, partly in elevation, on the line 2—2 of FIG. 1 to better illustate the relationship of components of the invention;

FIG. 3 is an enlarged view of the lower end of the arrangement of the present invention to more clearly illustrate the relationship of the components thereof; and FIG. 4 is an alternate form of the present invention.

DESCRIPTION OF THE PREFERRED EMBODIMENTS

Attention is first directed to FIG. 1 of the drawings wherein a plurality of generally horizontally extending supports is provided on an offshore platform (not shown) or the like in a water covered area. The horizontally extending supports S are laterally spaced in any suitable manner, some of which are above the surface of the water in the water covered area and some of which are below the surface of the water in the water covered area. Hanger means referred to by the letter H are provided which are secured to the laterally spaced support means S by suitable means such as welding or the like so as to extend in a general vertical relationship and which project forwardly of one side of the supports S as viewed in FIG. 1 of the drawings. It will be noted that the upper end portion 10 of the hanger H extends above the uppermost support S and that the lower end portion 11 of the hanger H extends beneath the lowermost horizontally extending support S. Ordinarily, a plurality of generally vertically extending hangers H is provided on the supports S at suitable laterally spaced intervals to provide a landing or boat dock area of desired extent adjacent an offshore structure or platform whereby a barge, vessel or other type of floating structure may be moved in close proximity to the platform in the water covered area and the structure of the present invention will provide a bumper against which the barge or other floating vessel may bump in response to movement by waves and the like and to prevent contact between the barge and fixed structure to inhibit damage which might otherwise occur due to contact of the vessel, barge or other floating structure and the fixed support or platform in the water covered area.

Generally, the supports S on the offshore structure are tubular in form as illustrated in the drawings, and the hanger H preferably assumes the configuration illustrated in FIG. 2 of the drawings, or the configuration illustrated in FIG. 4 of the drawings. In FIG. 2, it will be noted that the hanger H is shown as being formed by a quadrilateral having sides 15, 16, 17 and 18, with the side 18 being positioned in a plane forwardly of the leading portion or front portion of the supports S as better seen in FIG. 2 of the drawings. The width of the respective sides 15, 16, 17 and 18 as well as the thickness of the metal or material from which they are formed will depend upon several things, such as, for example, the impact loading they are to withstand. Also, the longitudinal extent of the hangers H will depend upon the water level due to tides and waves in the water covered areas. It is desirable that the arrangement of the present invention provide a bumper of suitable vertical extent between a floating vessel or structure and a fixed structure so that contact between the floating vessel and structure is prevented at the lowest water level as well as at the highest water level.

A support frame F is fixed to and extends longitudinally parallel to each of the hangers H and is preferably fixed thereto by any suitable means such as the nut 19 and bolt 20 for easy placement and removal of the frame F relative to the hanger H on which it is carried. The frame F is configured to receive and retain an elongated elastomer bumper body represented by the latter E against which the floating vessel or structure bumps or hits as it is positioned adjacent the structure in the water covered area with which the present invention is employed.

Preferably, the support frame F includes a pair of longitudinally extending sides 26 and 27 which are positioned in spaced relation by the first plate 28 extending therebetween and extending continuously throughout the longitudinal extent of the side plates 26 and 27.

The side plates 26 and 27 have their forward portions formed so as to form a pair of plates 30 and 31 which extend inwardly toward each other in the same plane as shown in FIG. 2 from one end of each of the sides 26 and 27 with the ends 32 and 33 of the plates 30 and 31 being positioned in spaced relation to each other to provide a gap or space therebetween. Also, the plates 30 and 31 are laterally spaced forwardly of the first plate 28 to provide an additional space 35 in the support frame F for receiving a portion of the elastomer elongated bumper body E therein for supporting it.

The elastomer body E is formed of a longitudinally extending elastomer element which has a base member portion referred to by the numeral 40 which is positioned adjacent the first plate 28 and sides 26, 27 in space 35 so that the plate and sides provide a support for the elastomer body E throughout its longitudinal extent. The base portion 40 of element E includes the side extending portions 41 and 42. The elastomer body E also is provided with a longitudinally extending groove represented at 43 and 44 on each side adjacent the sidewardly projecting protions 41 and 42, which grooves receive the plates 30 and 31 as shown in FIG. 2.

A forwardly projecting portion 48 extends beyond the plates 30 and 31 so that the element 3 projects forwardly of support frame F, and the portion 48 is provided with edge portions 49 and 50 which extend laterally beyond the side plates 26 and 27 as illustrated in FIG. 2 of the drawings. If desired, the portion 48 may be provided with a longitudinally extending cavity 55 therein to assist in providing a cushioning effect when a vessel bumps against the portion 48 of the elastomer body E.

The elastomer body E is retained in position on the support frame F as shown in FIG. 2 preferably by means of the bolts 54 and the nuts 55. It will be noted that the bolts 54 extend through the base portion 40 and the sides 41, 42 formed thereon and through the sides 26 and 27 of the support frame F at longitudinally spaced intervals therealong to retain the elastomer body E in position on the support frame F.

A guide means is secured on the lower end portion 11 of each of the hangers H, such stabbing shoe arrangement being illustrated in enlarged view in FIG. 3. In the form illustrated, the guide means consists of a plate 61 across the lower end 11a of each of the hangers which plate has a portion 62 exending upwardly out of the plane of the plate 61 and which portion 62 is spaced forwardly of the front surface 18 of the hanger H to provide a space 63 for receiving the lower end 28a of the first plate 28. It will be noted that the lower end of the support frame F terminates above and in spaced relation to the lower end 11a of the hanger H, which lower end of the support frame F is referred to by the numeral 49. The lower end of the elastomer element E is referred to by the numeral 48a, and both the end 48a of the element E and the lower end 49 of the support frame F thus terminate above the upper end 63' of the vertically extending portion 62 of the plate 61, which portion 62 extends upwardly and outwardly relative to the plate 61 and relative to the first plate 28. It will be noted that the outwardly extending portion 65 of the portion 62 is flared or tapered so that when the support frame F with the elastomer element E secured therein is lowered into position longitudinally along the plate 18 of the hanger H, the lower end 29a of the support frame F will be guided into its final seating position on the plate 61 as shown in FIG. 3 by contact with the portion 62.

If desired, the guide means may consist of a pin secured to and projecting from sides 15 and 17 in close proximity to the lower end 11a of each hanger. A longitudinal slot is provided in each side 26 and 27 of frame F which extends upwardly from the lower end of each side 26 and 27. The slots in sides 26, 27 are formed in sides 26, 27 so that when aligned with the pins on sides 15 and 17, the pins may be received in the slots to guide frame F onto the hanger H in proper position.

In FIG. 4 an alternate embodiment is illustrated wherein the hanger H is shown as being generally U-shaped and is provided with a pair of sides 26a and 27a which are joined by the first plate 28a. The outer portion between the plates 26a and 27a as illustrated at 30a is left open, and the ends of the plates 26a, 27a adjacent the opening 30a may be welded to the supports S in a manner similar to that described with regard to the quadrilateral illustrated in FIG. 2 of the invention.

It can be appreciated that after the hangers H have been secured to the horizontally extending, laterally spaced supports S, the support frame F may be provided with an elongated elastomer bumper E and secured therewith by means of the bolts 54 and nuts 55.

Thereupon, the support frame F with the elastomer body engaged therewith may be lowered longitudinally relative to the hanger H and secured therewith by positioning the nuts 19 through suitable openings (not shown) in the sides of the hanger H as well as in the side 26, 27 of the support frame F and secured by nuts 20 engaged with the bolts 19.

It can be appreciated that this structure also enables the foregoing to be readily removed merely by engaging the bolts and nuts in the hanger H and support frame F to disengage the nuts from the bolts thereby permitting the support frame F to be upwardly removed from the hanger H. The nuts and bolts which secure the support frame F to the hanger H and the nuts and bolts which secure the elastomer element E to the support frame F may be arranged adjacent the highest water level so that access may be had thereto when the water level is beneath such bolt and nut arrangement.

The foregoing disclosure and description of the invention are illustrative and explanatory thereof, and various changes in the size, shape and materials as well as in the details of the illustrated construction may be made without departing from the spirit of the invention.

This enables the entire support frame F and elastomer element E to be positioned on the hanger H without the necessity of using a diver since the lower end of the support frame F will engage the upper end 63' of the portion 62 and will be guided into seating position on the plate 61 as it is lowered adjacent hanger H. Thereafter, the bolts 19 and nuts 20 may be positioned through the openings in the sides of the hanger H and support frame F to secure the support frame F and the elastomer body E carried thereby on the hangers H.

What is claimed is:

1. A replaceable bumper support arrangement for positioning on generally horizontally extending and vertically spaced supports adjacent a water covered area comprising:

a. a hanger for securing to the supports to extend in a downward relationship in the water covered area and to project forwardly of the supports;
   b. said hanger having a pair of longitudinally extending sides which are positioned in spaced relation by a third side extending therebetween;
   c. a support frame for lowering downwardly in the water covered area adjacent said hanger to extend in a longitudinal, parallel relationship along and projecting forwardly of the hanger;
   d. longitudinally extending elongated elastomer body bumper means secured on said support frame;
   e. said support frame having longitudinally extending sides positioned in spaced relation by a longitudinally extending plate between said sides whereby said support frame may be guided by said hanger sides as said support frame and elastomer body thereon are lowered downwardly into the water covered area;
   f. said support frame having a lower end which terminates above and in spaced relation to the lower end of said hanger when positioned adjacent thereto in the water covered area;
   g. stabbing guide means secured adjacent the lower end of said hanger and projecting therefrom to receive, guide and seat the lower end of said support frame as it and the elongated elastomer body are lowered longitudinally along said hanger in a water covered area; and
   h. securing means for removably securing said support frame to said hanger, said securing means being positioned longitudinally of said support frame and hanger for access thereto above the water level in the water covered area.

* * * * *